E. Dickerman,
Clothes Drier.
Nº 33,075.    Patented Aug. 20, 1861.
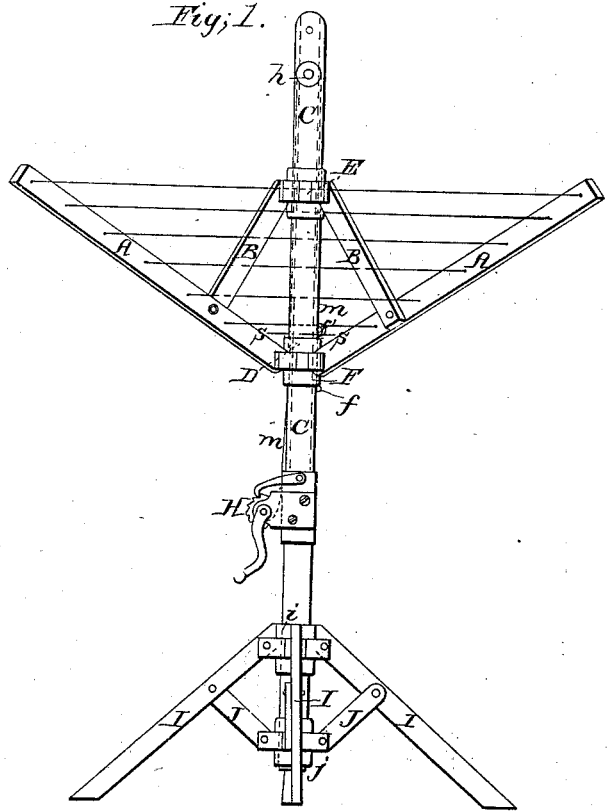
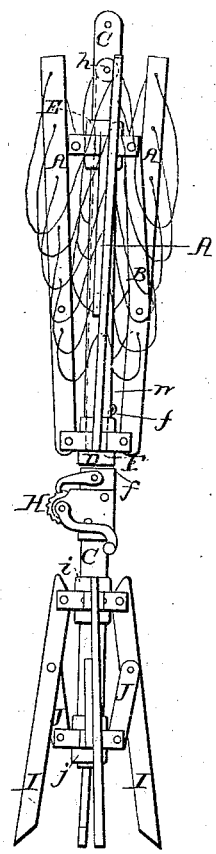
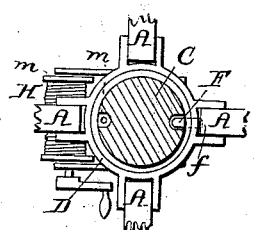
Witnesses;
D. W. Stetson
Chas. W. Smith
Inventor,
Elliot Dickerman
per G. H. Babcock, Atty.

UNITED STATES PATENT OFFICE.

ELLIOT DICKERMAN, OF MIDDLEFIELD, CONNECTICUT.

CLOTHES-FRAME.

Specification of Letters Patent No. 33,075, dated August 20, 1861.

*To all whom it may concern:*

Be it known that I, ELLIOT DICKERMAN, of Middlefield, in the county of Middlesex and State of Connecticut, have invented a certain new and useful Improved Clothes-Drier; and I do hereby declare that the following is a full and exact description of the same.

To enable others skilled in the art to make and use my invention I will proceed to describe its construction and operation by the aid of the accompanying drawings, in which—

Figure 1 is a side elevation with the parts spread for use. Fig. 2 is a similar view when closed for storage, and Fig. 3 is a section on the line S, S, in Fig. 1.

Similar letters of reference denote like parts in all the drawings.

C is the post which is cylindrical with a groove on each side as shown in Fig. 3.

A, A, are the arms attached to the sliding hub D and supported by the braces B, B, which are hinged to the hub E, in a manner common to many clothes driers. The hubs D and E are loose on the post C so as to permit the arms A and braces B to be raised or lowered upon C and to revolve freely thereon to allow of access to all parts of the line stretched upon A. This is also common to many other clothes driers.

Within the groove in one side of the post C and beneath the hub D I place a piece of metal F having a projection $f$ upon which the hub D rests, and an eye $f'$ at the other end, to which is attached a cord $m$. This cord passes along the groove in C under E, over a sheave $p$, fixed in a mortise in C and down the groove in the other side of C to a reel or windlass H, as represented. By rotating this reel, H, the cord $m$, may be wound up, and thereby elevate the hook F and hub D, thus raising the arms A. A ratchet and pawl on H hold it in any desired position. On releasing this pawl the arms may be lowered and the frame closed for storage. It will be observed that the hub D is supported solely by the hook F, $f$, which lies in the groove in C and that the cord in passing to H, passes in the groove under D and E so that in all positions D and E are free to rotate around C without in any manner affecting the cord $m$ or hook F, $f$.

In order to form a support for my post C I employ another series of arms I, I, and braces J, J, arranged similarly to A, B, excepting that they are reversed in position and the hubs $i$ and $j$, to which they are attached are not capable of revolving around the post, the hub $j$, being fixed firmly to the end of C. The hub $i$ slides upon the post C for the purpose of opening and closing the legs I, I, and is held in position by a set screw or other suitable means, if desired. The legs I project above the joint in $i$, as shown so as to form a shoulder which bears firmly upon the hub when the legs are opened, and thus limits their motion and stiffens them when in use.

When folded the arms A, legs I, and braces B and J, all lie nearly parallel to C as shown in Fig. 2, and occupy but little space, but when expanded the whole forms a self supporting revolving clothes drier, simple in construction, not liable to get out of order, and which may be placed in any spot desired, as it requires no fixture for its support.

My hook F, $f$, sunk in the groove in C allows a turning of the clothes so as to attach or detach the whole without moving the clothes basket, and yet involves no complicated or delicate construction of pulleys, no risk of twisting the hoisting cord, and no necessity for making the hub D any larger than is sufficient to fit over the bare cylindrical post. My reel H arranged as represented, insures that the tension of the hoisting cord shall be always in or very near the line of the groove so that very little friction or wear upon the cord $m$ is created either in the sliding or rotation of D and E. My arrangement of the folding legs supports the structure efficiently while folding into the least space both laterally and longitudinally when not wanted.

Having now fully described my inven- tion, what I claim as new therein and desire to secure by Letters Patent, is—

1. The hook F sliding in the groove c and arranged to support the hub D upon its projection f as herein set forth.

2. The combination of the cylindrical grooved post C, hub D, and reel H, as and for the purposes specified.

3. Providing a clothes drier with folding legs I, I, arranged to be extended by the depression and closed by the elevation of the hub i as herein set forth.

In testimony whereof I have hereunto set my hand in the presence of two subscribing witnesses.

ELLIOT DICKERMAN.

Witnesses:
D. R. WRIGHT,
JAS. D. FRARY.